UNITED STATES PATENT OFFICE.

MARTIN WILHELM LUDWIG NAHNSEN, OF SCHÖNEBECK-ON-THE-ELBE, GERMANY.

MANUFACTURE OF CEMENT.

SPECIFICATION forming part of Letters Patent No. 584,397, dated June 15, 1897.

Application filed January 11, 1896. Serial No. 575,144. (No specimens.) Patented in France November 27, 1895, No. 252,038; in Belgium December 24, 1895, No. 119,032, and in England December 28, 1895, No. 24,898.

*To all whom it may concern:*

Be it known that I, MARTIN WILHELM LUDWIG NAHNSEN, a subject of the King of Prussia, German Emperor, and a resident of Schönebeck-on-the-Elbe, in the Kingdom of Prussia, German Empire, have invented an Improved Process for the Manufacture of Cement and Cement Mortar, (for which patents have been obtained in France, No. 252,038, dated November 27, 1895; in Belgium, No. 119,032, dated December 24, 1895, and in Great Britain, No. 24,898, dated December 28, 1895,) of which the following is an exact specification.

On manufacturing sulfate of alumina from bauxite, clay, kaolin, alunite, and similar minerals there result large quantities of residues that are insoluble in water. Said residues have up to now not found a satisfactory technical use, but are generally piled up in large heaps and are regarded as a rather inconvenient ballast. After extensive trials I have succeeded in finding out a method that allows of turning said residues into account. Said method is based on the newly-discovered fact that the said residues when combined with lime produce a quickly and well hardening compound.

In carrying my invention into effect I first wash the residues, preferably with the aid of a filter-press, and I then remove the remaining contents of water, (about fifty per cent.,) or, more precisely, a great portion of said water, by carefully applying a rather low degree of heat to said washed residues. I call special attention to the fact that the binding or holding power of the cement to be produced is greatly diminished if the said residues become perfectly devoid of water. Said possibility is already done away with if the quantity of water remaining amounts to ten per cent. only, but I prefer to let the remainder of water amount to not less than twenty-five per cent. To have a proper control of the drying, the latter should be performed slowly and watched attentively.

In the next or last step of my novel process the residues treated as above stated are mixed with quicklime and are ground together with the same. There results a practically dry powder, the quicklime having sucked up the whole remainder of water above mentioned. Said powder is the cement to be produced and is just as good as the so-called "Portland" cement and may well be subjected to the same tests as said latter.

Instead of using quicklime I may employ powdered hydrate of lime. I prefer, however, the former, as otherwise the drying of the residues must be carried on for a considerably longer time.

The proportion in the quantities of the components forming the cement may vary according to the special employment for which the cement is intended. In general I take equal parts of the two components in question; but if the cement is intended for use below water or if it is to harden in a very short time I then use more residues than lime. If, on the other hand, the quality of the cement can be a low one, I employ more lime than residues. If, finally, the quicklime contains alumina, it is in either case advantageous to take less residues than lime.

The manufacture of mortar from the cement in question is either carried on in the usual manner, consisting in mixing said cement with water and sand, or the said cement (preferably mixed with water) is added to lime mortar either during or after the production of the same.

Having thus fully described the nature of this invention, what I desire to secure by Letters Patent of the United States is—

1. The method of producing a cement out of the residues resulting from the manufacture of sulfate of alumina, consisting in freeing said residues from those components that are soluble in water, and mixing the remainders with lime, without burning the mixture, substantially as described.

2. The method of producing a cement out of the residues resulting from the manufacture of sulfate of alumina, consisting in freeing said residues from those components that are soluble in water and mixing the remainders with hydrate of lime, without burning the mixture, substantially as described.

3. The method of producing a cement out of the residues resulting from the manufacture of sulfate of alumina, consisting in freeing said residues from those components that are soluble in water, depriving the remainders of a part of their water, and mixing them with lime, without burning the mixture, substantially as described.

4. The method of producing a cement out of the residues resulting from the manufacture of sulfate of alumina, consisting in freeing said residues from those components that are soluble in water; depriving the remainders of a part of their water by exposing them to heat, and mixing them with quicklime, without burning the mixture, substantially as described.

In testimony whereof I have signed this specification in the presence of two subscribing witnesses.

MARTIN WILHELM LUDWIG NAHNSEN.

Witnesses:
JULIUS MUTH,
M. C. MUTH.